United States Patent
Proeschel et al.

(10) Patent No.: US 8,444,324 B2
(45) Date of Patent: May 21, 2013

(54) WHEEL BEARING FOR AN AIRCRAFT LANDING GEAR

(75) Inventors: Christian Proeschel, Wuerzburg (DE); Robin Lang, Bundorf (DE); Thorsten Dotzel, Euerbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 349 days.

(21) Appl. No.: 12/747,357

(22) PCT Filed: Dec. 2, 2008

(86) PCT No.: PCT/DE2008/002006
§ 371 (c)(1),
(2), (4) Date: Jun. 10, 2010

(87) PCT Pub. No.: WO2009/074134
PCT Pub. Date: Jun. 18, 2009

(65) Prior Publication Data
US 2010/0290731 A1    Nov. 18, 2010

(30) Foreign Application Priority Data
Dec. 11, 2007  (DE) .......................... 10 2007 059 587

(51) Int. Cl.
*F16C 19/28*    (2006.01)
(52) U.S. Cl.
USPC ......................................................... 384/589

(58) Field of Classification Search
USPC .................. 384/449, 456, 544, 589; 152/396, 152/397; 301/64.306
See application file for complete search history.

(56) References Cited

U.S. PATENT DOCUMENTS

| 2,623,792 | A | * | 12/1952 | Mills | 301/13.1 |
| 3,836,201 | A | * | 9/1974 | Stimson et al. | 301/6.2 |
| 5,086,821 | A | | 2/1992 | Russell et al. | |
| 5,409,048 | A | | 4/1995 | Kipp et al. | |
| 2010/0202719 | A1 | * | 8/2010 | Dotzel et al. | 384/456 |

FOREIGN PATENT DOCUMENTS

| GB | 764 097 | 12/1956 |
| JP | 2007 315526 | 12/2007 |

* cited by examiner

*Primary Examiner* — Thomas R Hannon
(74) *Attorney, Agent, or Firm* — Lucas & Mercanti, LLP

(57) ABSTRACT

A wheel bearing for aircraft. The bearing has a long service life, is very reliable and consists of the lowest possible number of individual parts. The wheel bearing of an aircraft engine has a rim that is rotatably mounted about an axis by a bearing arrangement which has two rolling bearings. An outer bearing housing, designed as one piece, contains the outer running surfaces of the rolling bearings. An integral component of the outer bearing housing forms part of the rim and the outer bearing housing is detachably connected to the remainder of the rim.

2 Claims, 2 Drawing Sheets

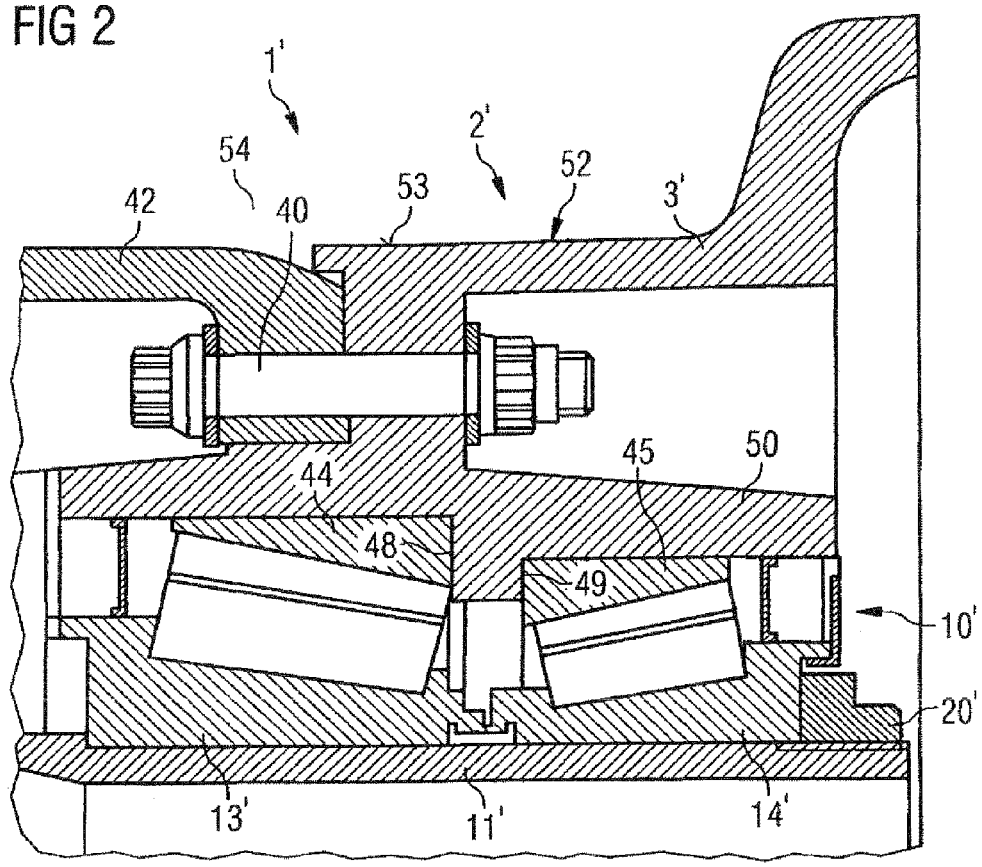

WHEEL BEARING FOR AN AIRCRAFT LANDING GEAR

Figure 1:
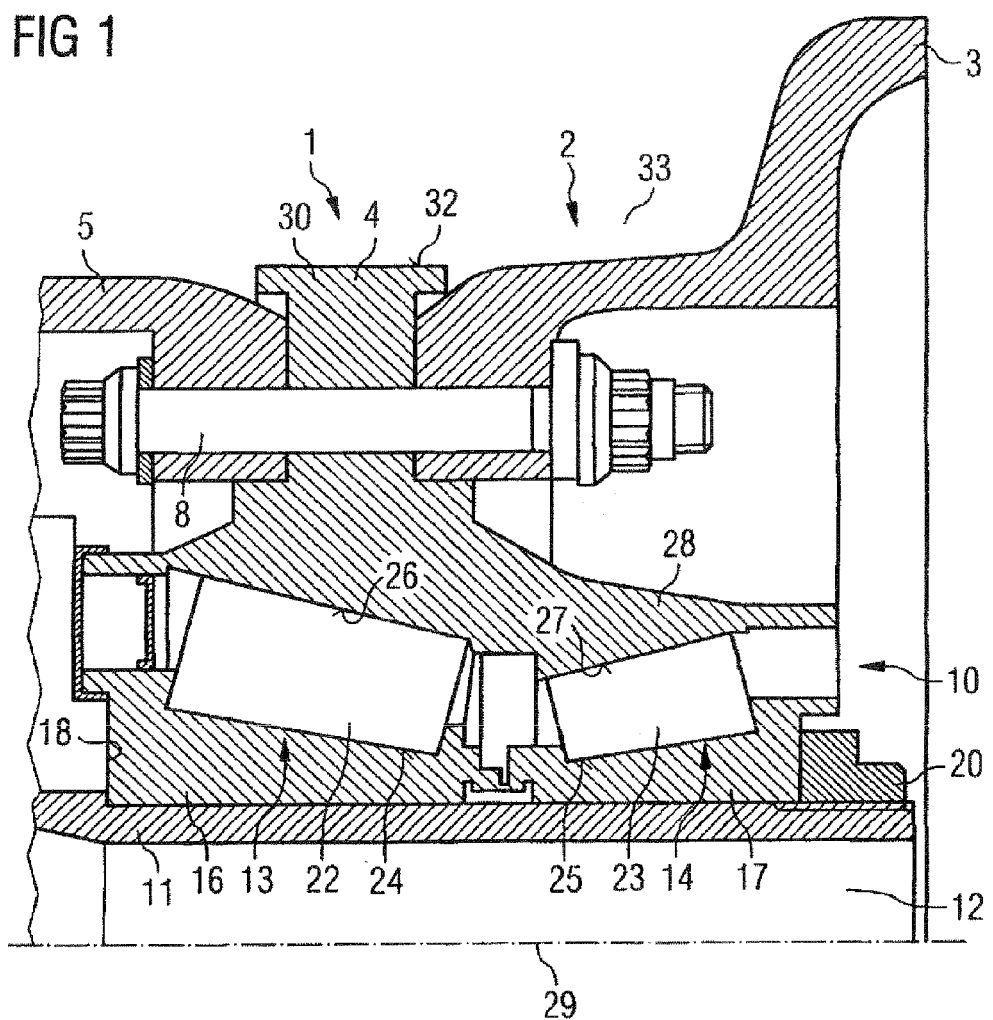

This application is a 371 of PCT/DE2008/002006 filed Dec. 2, 2008, which in turn claims the priority of DE 10 2007 059 587.7 filed Dec. 11, 2007, the priority of both applications is hereby claimed and both applications are incorporated by reference herein.

FIELD OF THE INVENTION

The invention lies in the field of landing gear for aircraft, in particular for freight and commercial aircraft, and relates to a wheel bearing for an aircraft landing gear, with a rim which is mounted rotatably about an axis via a bearing arrangement.

In this field of use, various, sometimes opposed optimization criteria have to be met. For example, landing gear of this type and therefore wheel bearings are loaded only briefly—but extremely highly in these phases—in relation to the overall operating period of the aircraft. During said phases, the wheel bearings have to operate with maximum reliability, and have to absorb extreme forces and torques—for example during the braking operation following the landing—and should nevertheless be as lightweight and as low maintenance as possible.

With regard to maintenance, in particular inspection of the bearings and brakes, it is desirable to be able to use standard bearings, but nevertheless to implement a high level of integration and to provide subassemblies which are as simple and as compact as possible.

Against this background, it is the object of the present invention to provide a wheel bearing for aircraft, said wheel bearing having a long service life and high reliability with the smallest possible number of individual parts and with a low inherent weight.

This object is achieved according to the invention by a wheel bearing having the features of patent claim 1.

According thereto, the wheel bearing according to the invention comprises a rim which is mounted rotatably about an axis via a bearing arrangement having two anti-friction bearings, and a bearing outer housing which is designed as a single part and which contains the outer running surfaces of the anti-friction bearings, wherein an integral component of the bearing outer housing forms a part of the rim, and wherein the bearing outer housing is connected releasably to the rest of the rim.

A first essential aspect of the invention therefore consists in the outer races being jointly held by a single component, namely the single-part bearing outer housing, or being integrated in said component. As a result, the bearing arrangement already experiences a considerable optimization with regard to the inherent weight thereof.

A further essential aspect of the invention consists in the rim being partially formed by the bearing outer housing, thus resulting in a further reduction in the number of components. This not only has an advantageous effect on the manufacturing costs, but also on the logistics and the stocking of replacement parts. In addition, the overall weight of the bearing arrangement is considerably optimized by the reduced number of components.

By means of the refinement according to the invention of the wheel bearing, a specific preload of the bearing can be implemented, in which case a particularly compact arrangement even having an enlarged bearing pitch circle is possible in a space-saving manner, and therefore the respective landing gear brake may be arranged in the direct vicinity of the bearing arrangement. In addition, the unit formed by the rim and bearing outer housing can be installed and can be removed as a closed system and forms a system which is well sealed to the outside.

According to an advantageous refinement of the invention, the bearing outer housing is arranged in that part of the bearing arrangement which is freely rotatable about the axis.

According to another advantageous refinement of the invention, the running surfaces of the anti-friction bearings are integral components of the bearing outer housing. For this purpose, the running surfaces or the bearing outer races can particularly preferably be composed directly of the material of the bearing outer housing. This further reduces the number of individual parts to be installed and the required logistics for the individual parts and replacement parts.

In terms of installation and for maintenance purposes, a development of the invention is advantageous, in which the integral component of the bearing outer housing forms a laterally accessible rim outer part.

Further aspects and advantages of the invention also emerge from the description below of the exemplary embodiments which are illustrated in the drawing, in which:

FIG. 1 shows a first wheel bearing according to the invention for an aircraft landing gear; and FIG. 2 shows a second wheel bearing according to the invention.

In the figures, identical or functionally identical elements are provided with the same reference numbers.

FIG. 1 shows in longitudinal section the upper part of a wheel bearing 1 according to the invention of an aircraft landing gear (not illustrated specifically). The wheel bearing comprises a rim 2 which is composed of a rim side part 3, a rim central part 4 and a left rim outer part 5 which adjoins on the left and is only partially illustrated. A tire (not illustrated) can be fitted onto the rim 2 in a manner known per se. The rim parts 3, 4 and 5 are connected releasably to one another by a plurality of axial screws 8.

The rim 2 is mounted rotatably via a bearing arrangement 10 on a stub axle 11 of a hollow axle 12 (merely indicated). The bearing arrangement comprises two anti-friction bearings 13, 14 which, in the exemplary embodiment, are designed as tapered roller bearings. The anti-friction bearings respectively comprise an inner race 16, 17 which bears against a shoulder 18 on the stub axle 11 and is clamped via an axle nut 20. The tapered rollers 22, 23 roll along the inner races of the respective running surfaces 24, 25. In the exemplary embodiment according to FIG. 1, the outer running surfaces 26, 27 for the anti-friction elements (tapered rollers) 22, 23 are particularly preferably formed integrally in a bearing outer housing 28. In other words, the bearing outer races here are not designed as separate parts but rather are directly formed by the material of the bearing outer housing 28. The bearing outer housing 28 together with the bearing outer races therefore forms the bearing part which is freely rotatable about the longitudinal axis 29 of the wheel bearing.

The bearing outer housing 28 has a radially outwardly extending extension 30 which is penetrated by the axial screw 8 and ends with an outer circumferential surface 32 in the interior region 33 of the tire (not illustrated). The integral extension 30 and the circumferential surface 32 therefore form that part of the rim 2 which has already been referred to at the beginning as the rim central part 4.

With this configuration, an additional subfunction—namely as a rim component—is firstly assigned to the bearing outer housing 28 and secondly a particularly high degree of stability and a symmetrical load-bearing capacity of the bearing arrangement are implemented. The compact configuration enables the rim together with the bearing outer housing to be configured in such a manner that it can easily be removed as a closed unit. This considerably increases the ease of maintenance, for example, while at the same time significantly reducing the weight of the overall constructional unit.

FIG. 2 shows an alternative configuration of a wheel bearing 1' according to the invention. In contrast to the embodiment according to FIG. 1, the rim 2' here comprises a right rim outer part 3' which is connected via an axial screw 40 to the rest of the rim part 42 which adjoins on the left-hand side and is only partially illustrated. As an alternative to the configuration according to FIG. 1, the anti-friction bearings 13', 14' are configured with separate bearing outer races 44, 45 which bear against corresponding stops or shoulders 48, 49 of a bearing outer housing 50. The rim part 3' is also an integral component of the bearing outer housing 50 here and is formed integrally from the material of the bearing outer housing 50. The bearing arrangement 10' is fixed on the stub axle 11' via an axle nut 20', as already explained in conjunction with FIG. 1.

In the configuration according to FIG. 2, a considerable portion of the rim 2' is therefore formed by the extension 52 of the bearing outer housing 50, said extension extending radially over the axial screw 40 and the circumferential surface 53 of said extension forming a boundary wall or boundary surface for the interior 54 of the tire (not illustrated here).

LIST OF DESIGNATIONS 1, 1' Wheel bearing
2, 2' Rim
3 Rim side part
3' Rim outer part
4 Rim central part
5 Rim outer part
8 Axial screws
10, 10' Bearing arrangement
11, 11' Stub axle
12 Axle
13, 14 Anti-friction bearing
13', 14' Anti-friction bearing
16, 17 Inner race
18 Shoulder
20 Axle nut
20' Axle nut
22, 23 Tapered rollers
24, 25 Running surfaces
26, 27 Outer running surfaces
28 Bearing outer housing
29 Longitudinal axis
30 Extension
32 Circumferential surface
33 Interior region
40 Axial screw
42 Rim part
44, 45 Bearing inner races
48, 49 Stops/shoulders
50 Bearing outer housing
52 Extension
53 Circumferential surface
54 Interior

The invention claimed is:

1. A wheel bearing for an aircraft landing gear, comprising:
a rim, which is mounted rotatably about an axis via a bearing arrangement, having two anti-friction bearings;
a bearing outer housing which is designed as a single piece part, and outer running surfaces of the anti-friction bearings are directly formed on the bearing outer housing; and
two inner rings on which the two anti-friction bearings respectively roll, the inner rings configured to be mounted on an axle and clamped in series between an axle nut and a shoulder, the two anti-friction bearings each comprising tapered rollers,
wherein an integral component of the bearing outer housing forms a part of the rim, and the bearing outer housing is connected releasably to a rest of the rim,
the bearing outer housing having a radially outwardly extending projection that has a radially outer circumferential surface disposed so that the circumferential surface is in an interior of a tire that is finable onto the rim.

2. The wheel bearing of claim 1, wherein the bearing outer housing is arranged in a part of the bearing arrangement which is freely rotatable about the axis.

* * * * *